Sept. 1, 1970      E. V. BURGE      3,526,284

DRILL STRING SHOCK ABSORBER

Filed Jan. 13, 1969      3 Sheets-Sheet 1

INVENTOR.
Edward V. Burge
BY Ehley & Ehley
ATTORNEYS

Sept. 1, 1970  E. V. BURGE  3,526,284
DRILL STRING SHOCK ABSORBER
Filed Jan. 13, 1969  3 Sheets-Sheet 2
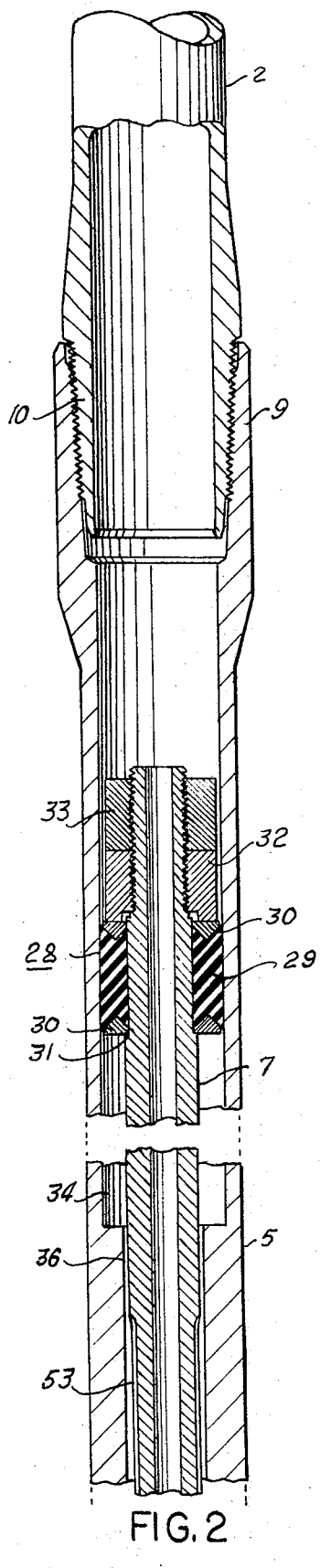
INVENTOR.
Edward V. Burge
BY Shley & Shley
ATTORNEYS Sept. 1, 1970
E. V. BURGE
3,526,284
DRILL STRING SHOCK ABSORBER
Filed Jan. 13, 1969
3 Sheets-Sheet 3
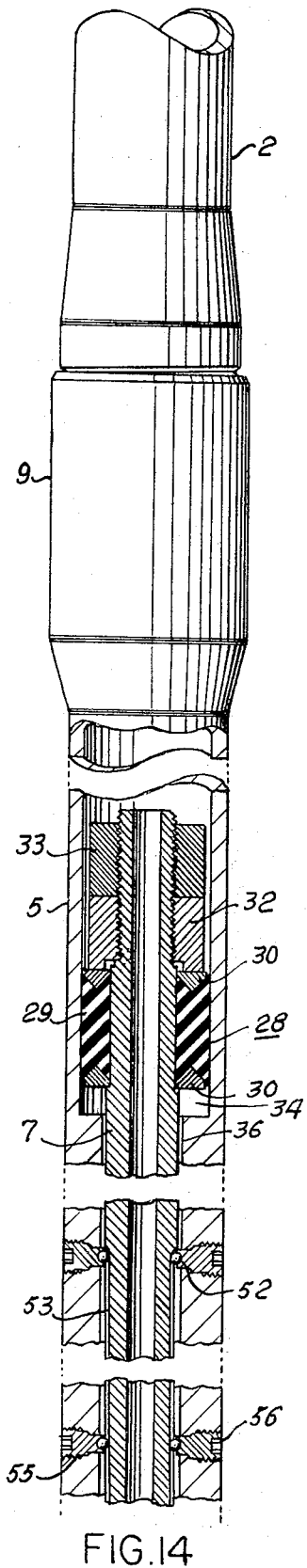
FIG.14
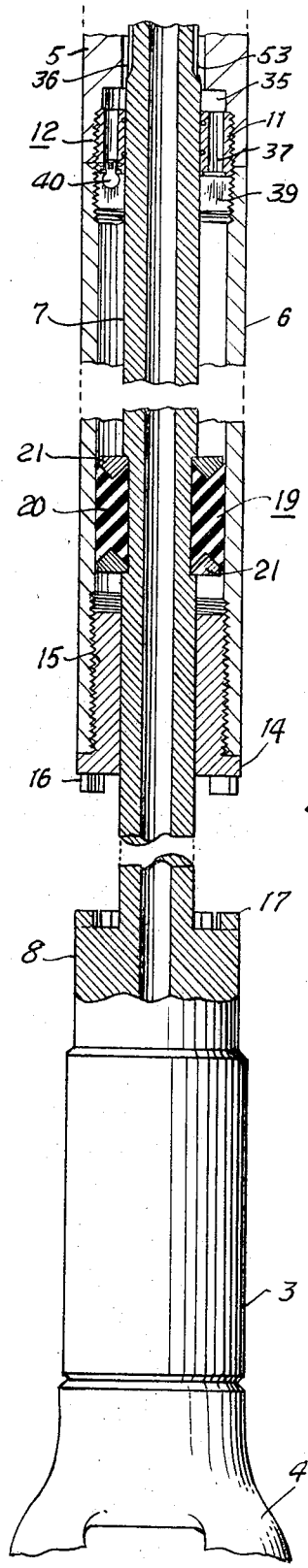
FIG. 14-A
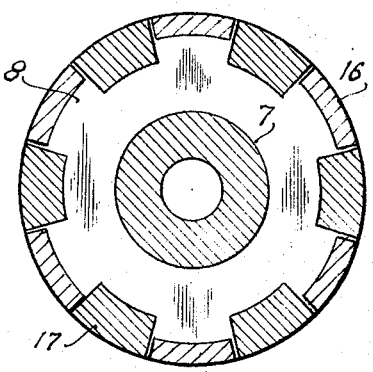
FIG.4
FIG.5
FIG.6
INVENTOR.
Edward V. Burge
BY Ehley & Ehley
ATTORNEYS

United States Patent Office

3,526,284
Patented Sept. 1, 1970

3,526,284
DRILL STRING SHOCK ABSORBER
Edward V. Burge, Corpus Christi, Tex., assignor to Bossco, Inc., Corpus Christi, Tex., a corporation of Texas
Filed Jan. 13, 1969, Ser. No. 790,518
Int. Cl. E21b *17/00*
U.S. Cl. 175—318               6 Claims

ABSTRACT OF THE DISCLOSURE

A drill string shock absorber having a tubular mandrel slidably connected in a tubular housing and depending therefrom for connection with a drill bit. A closed chamber, containing a noncompressible fluid, is formed in the housing around the mandrel by seal elements fixed to and movable with said mandrel on opposite sides of check valve means which controls the flow of the fluid upon reciprocation of said mandrel relative to said housing and which permits faster downward reciprocation.

SUMMARY OF THE INVENTION

A shock absorber for a drill string including a tubular housing adapted to be connected in the string adjacent its drill bit. A tubular mandrel is slidably connected in the housing and depends therefrom for connection with the bit and carries a pair of seal elements which forms a closed chamber within said housing. The chamber contains a noncompressible fluid and has a check valve assembly therein between the seal elements for controlling the flow of the fluid upon reciprocation of the mandrel relative to the housing and thereby cushion the movement of said mandrel. Flow ports extend axially through the valve assembly with certain of the ports having check valves for preventing upward flow therethrough whereby the relative upstroke of the mandrel is slower than the downstroke thereof. The other flow ports are provided with adjustable choke means whereby flow therethrough may be regulated in accordance with the desired rapidity of both upward and downward reciprocation of the mandrel relative to the housing. Elongate longitudinal grooves are formed in the exterior of the mandrel for receiving ball bearings carried by the housing so as to transmit rotations to said mandrel without interfering with relative reciprocation thereof.

It is readily apparent that the shock absorber increases drilling efficiency by prolonging the life of the drill bit, thereby saving bit cost and trip time as well as increasing the salvage value of diamond bits. Also, the drill bit is maintained in engagement with the bottom of the borehole to prevent percussion-type damage thereof by the retraction and extension of the shock absorber which also reduces fatigue and crystalization of the drill collar and other members of the drill string so as to prolong the life thereof. The shock absorber maintains a constant weight on the drill bit by permitting controlled reciprocation of said bit relative to the drill string and preventing suspension of said bit off of the bottom of the borehole and consequent spudding damage thereto as well as to the remainder of said drill string. This is particularly important when the drill string is suspended from a vessel or other floating platform during marine drilling whereby said drill string is reciprocated by the undulation of waves. Of course, the shock absorber cushions the movement of its mandrel relative to its housing when the drill bit strikes a hard formation; however, said shock absorber is designed primarily to cushion movement of said housing relative to the mandrel when the drill string is subjected to wave action in marine drilling.

BRIEF DESCRIPTION OF THE DRAWINGS

FIG. 3 is a transverse, vertical sectional view, taken on the line 3—3 of FIG. 5, showing two of the adjustable chokes, FIGS. 4 and 5 are enlarged, horizontal, cross-sectional views taken on the respective lines 4—4 and 5—5 of FIG. 2-A, FIG. 6 is an enlarged, horizontal, cross-sectional view taken on the line 6—6 of FIG. 2-B, FIG. 7 is a perspective view of one of the thrust rings, in open position, of one of the seal elements of the shock absorber.

DESCRIPTION OF THE PREFERRED EMBODIMENT

Figure 1:
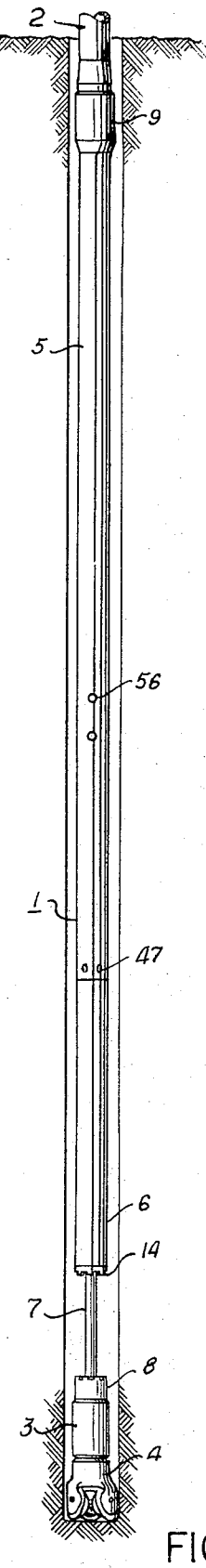
FIG. 1 is a side elevational view of a shock absorber, constructed in accordance with the invention, mounted in a drill string above its drill collar and drill bit and partially extended, FIGS. 2, 2-A and 2-B are enlarged, longitudinal, sectional views of the shock absorber and drill string with said shock absorber in fully contracted position.

In the drawings, the numeral 1 designates a shock absorber embodying the principles of the invention and mounted in an oil well drill string 2 above its drill collar 3 and drill bit 4. Although not illustrated, it is readily apparent that the drill string 2 may be of the marine type and extend upwardly to a drilling platform or vessel as shown in U.S. Pat. No. 3,319,726. Also, the usual well casing has been omitted for simplicity of illustration. The shock absorber 1 includes an elongate, upper, tubular member or barrel 5, a lower, tubular member or barrel 6 and an elongate, tubular member of mandrel 7 extending telescopically substantially throughout the interiors of the barrels and having an enlarged head 8 integral with its lower end, said barrels coacting to provide a housing. An enlarged box 9 is provided at the upper end of the upper barrel 5 for screwthreaded connection with the lowermost pin 10 of the drill string 2 (FIG. 2) and the abutting ends of the barrels are internally screwthreaded for connection by the screwthreaded exterior of a bushing 11 (FIGS. 2-A and 3) which forms the tubular body of a check valve assembly 12. The head 8 has a reduced pin on its lower end screwthreaded into the upper box of the drill collar 3, as shown at 13 in FIG. 2-B, and is spaced from the lower barrel 6 by an external flange 14 formed on the lower end of a bushing 15 screwthreaded into the lower end of said barrel. A circle of equally-spaced lugs or teeth 16 depend from the flange 14 of the bushing 15 for coacting engagement with similar lugs or teeth 17 upstanding from the head (FIG. 6) to permit direct connection of said head to the lower barrel when the shock absorber is in its fully retracted position (FIGS. 2, 2-A and 2-B).

Figure 11:
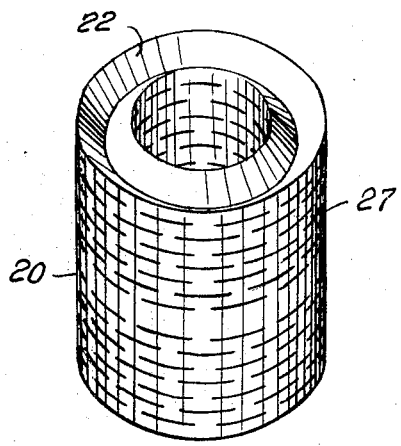
FIG. 11 is a perspective view of one of the seal elements.
Figure 12:
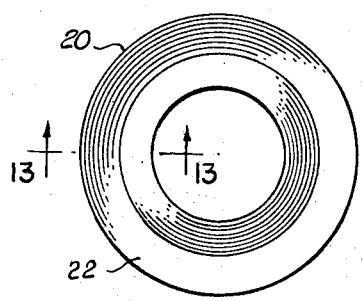
FIG. 12 is a plan view of the seal element.
Figure 13:
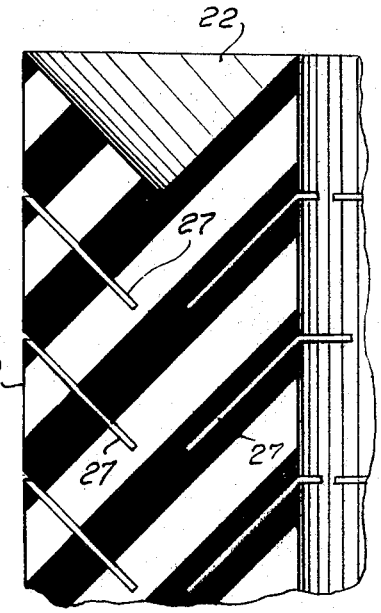
FIG. 13 is an enlarged, transverse, vertical, sectional view taken on the line 13—13 of FIG. 12, FIGS. 14 and 14-A are longitudinal, sectional views of the shock absorber and drill string with said shock absorber in fully extended position.

The internal diameter of the lower barrel 6 is greater than the external diameter of the mandrel 7 to accommodate the bushing 15 at its lower end and the check valve assembly 12 at its upper end, said mandrel being slidable through said bushing and assembly. Between the check valve assembly and bushing, the mandrel is externally recessed to provide opposed shoulders 18 for confining a seal element 19 which is adapted to pack off between the lower barrel and mandrel (FIG. 2-A). The seal element 19 includes a cylindrical packing sleeve 20, suitable elastic material, and overlying and underlying thrust rings 21. As best shown in FIGS. 11-13, annular grooves 22 are formed in the upper and lower ends of the packing sleeve 20 and are V-shaped in radial section to receive the complementary adjacent surfaces 23 (FIG. 7) of the thrust rings 21. Each of the latter is of two-piece construction, being hinged at 24 and adapted to be held in closed position by a coacting pin 25 and opening 26. A plurality of inclined, radial slits 27 are cut in the internal and external cylindrical surfaces of the packing sleeve in spaced relationship for increasing the flexibility thereof. An identical seal element 28, having a packing sleeve 29 and thrust rings 30, is confined upon the upper end portion of the mandrel 7 between an underlying shoulder 31 and overlying nuts 32 and 33 which are screwthreaded on the upper end of said mandrel (FIG. 2). The upper barrel 5 has a counterbore 34, of greater diameter than the mandrel, in its upper end portion for accommodating the seal element 28 which is adapted to pack off around said mandrel.

Also, a similar counterbore 35 is provided at the lower end of the upper barrel to accommodate the check valve assembly 12. Between the counterbores 34 and 35, the upper barrel 35 has a bore 36 of slightly greater diameter than the mandrel 7 for permitting communication between said counterbores as well as the interior of the lower barrel 6 above the seal element 19. A chamber is formed between the seal elements by the coaction of the bore, counterbore and lower barrel interior and is adapted to contain a noncompressible fluid to cushion the telescoping movement of the mandrel relative to the barrels. The check valve assembly 12 is adapted to control the flow of fluid between the interior of the lower barrel 6 and the counterbore 34 of the upper barrel 5, this flow being through the counterbore 35 and bore 36 of said upper barrel, and has a plurality of ports 37 (FIG. 2-A) and 38 (FIG. 3-A) extending axially through its body 11. Preferably, these ports are equally spaced with the ports 37 being disposed alternately relative to the ports 38.

Figure 8:
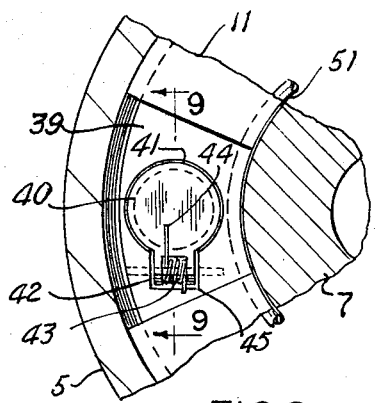
FIG. 8 is an enlarged, horizontal, cross-sectional view, taken on the line 8—8 of FIG. 2-A, showing one of the closed check valves.
Figure 9:
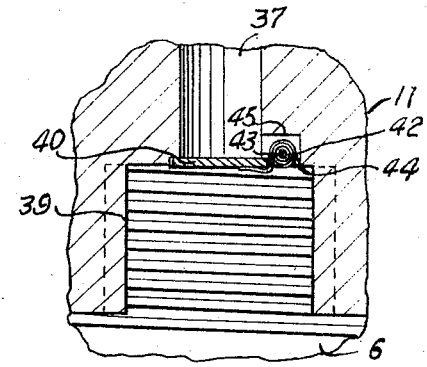
FIG. 9 is an enlarged, transverse, vertical, sectional view taken on the line 9—9 of FIG. 8.
Figure 10:
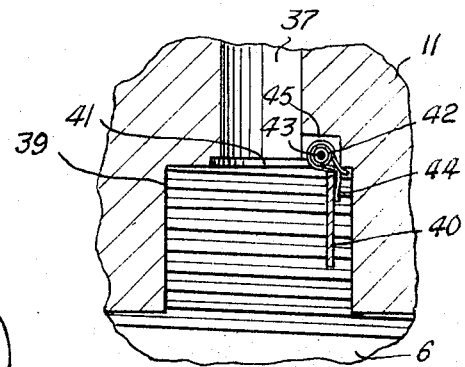
FIG. 10 is a view, similar to FIG. 9, showing the check valve in open position.

Below each port 37, the lower end of the valve body is slotted to provide a relatively large recess 39 for accommodating a check valve element or plate 40 which is adapted to underlie and close said port as shown in FIGS. 8-10. Each valve plate 40 is circular and the lower extremity of each port 37 is enlarged to provide a seat 41 complementary to said plate. A pair of apertured, parallel ears 42 projects laterally from the periphery of each valve plate for receiving a pivot pin 43 which extends transversely of the valve body 11 and which is suitably journaled therein. The pivot pin 42 has a spring 44 confined thereon between the ears 42 for urging the valve plate 40 into engagement with the seat 41, the valve body being recessed at 45 to accommodate said ears and spring. Due to this arrangement, it is readily apparent that upward flow through the ports 37 is prevented when the mandrel 7 moves upwardly relative to the barrels 5 and 6 and that downward flow through said ports is permitted when said mandrel moves downwardly relative to said barrels.

Flow through the ports 38 is regulated by choke elements of pins 46 (FIGS. 3 and 5) which are adapted to extend through alined, radial openings 47 and 48 formed in the upper barrel 5 and valve body 11 into said ports. The barrel openings 47 are screwthreaded for engagement by the screwthreaded outer portions 49 of the pins 46. A semispherical head 50, of substantially the same diameter as the ports, is formed on the inner end of each pin whereby the effective flow area of said ports may be varied between full open and substantially full closed by outward and inward adjustment of the choke pins. Manifestly, the speed of reciprocation of the mandrel 7 is controlled by the rate of flow through the ports 37 and 38, with upward movement being much slower than downward movement due to the closing of said ports 37 by the valve plates 40 whereby the fluid may flow upwardly only through said ports 38 upon such upward movement. Suitable packing 51, such as O-rings, are mounted in the internal cylindrical surface of the valve body for sealing off around the mandrel as best shown in FIGS. 5 and 8.

In order to impart rotation to the mandrel 7 without interfering with its reciprocation, said mandrel is slidably connected to the upper barrel 5 by a plurality of ball bearings 52. As shown in FIGS. 2-A and 4, longitudinal grooves 53 are formed in the exterior of the mandrel to provide races for the ball bearings 52 and are disposed in equally spaced relationship. Preferably, four grooves are provided so that said grooves and their respective ball bearings are disposed in diametrically opposed pairs. It has been found that two spaced radial groups or sets of ball bearings are sufficient although more groups or sets may be employed. Radial openings 54 extend through the wall of the upper barrel to permit insertion of the ball bearings 52 into the grooves 53 and have their outer portions 55 enlarged and screwthreaded for receiving complementary plugs 56 which retain said ball bearings. As shown at 57 in FIG. 4, a semispherical recess is formed in the inner end of each plug 56 for complementary engagement with the ball bearings. It is readily apparent that the ball bearings permit reciprocal movement of the mandrel and transmit rotation of the upper barrel to said mandrel. Also, it is noted that the grooves 53 are of sufficient length to accommodate the stroke of the mandrel.

In operation, the shock absorber 1 is fully extended as shown in FIGS. 14 and 14-A with the lower seal element 19 being in the lower portion of the lower barrel 6 adjacent the bushing 15 whereby an appreciable portion of the mandrel 7 depends below said barrel and positions the mandrel head 8 a considerable distance from said bushing. Also, the upper seal element 28 is in the lower portion of the counterbore 34 of the upper barrel 5 with the result that most of the fluid within the chamber, formed by said counterbore in coaction with the counterbore 35, bore 36 and lower barrel interior, is disposed below the check valve assembly 12. Since the valve plates 40 are held closed by the springs 43, upward movement of the mandrel is resisted because the fluid can be displaced upwardly only through the ports 38. As pointed out hereinbefore, this resistance can be increased by inward adjustment of the choke pins 46 so as to reduce the effective flow area of the ports 38. When the drill bit strikes a hard formation, the mandrel 7 moves upwardly in accordance with the flow restriction provided by the choked ports 38. The fluid below the check valve assembly cushions the upward thrust of the mandrel and is slowly forced through the ports 38 by the upward travel of the lower seal element.

Upon cessation of the upward thrust, the weight of the mandrel, drill collar 3 and drill bit 4 pulls said mandrel downwardly to at least a partially extended position (FIG. 1). Since the upper seal element forces the fluid downwardly, the check valve plates swing open to permit downward flow through the ports 37 whereby the downward reciprocation of the mandrel 7 is much faster than its upward movement. It is noted that the shock absorber is of benefit also in marine drilling, particularly, when the drill string 2 is suspended from a vessel or other floating platform. During such drilling, the entire drill string is subject to reciprocation by the movement of waves and causes the drill bit to strike the bottom of the borehole. Due to the cushioning action of the shock absorber, damaging of the drill bit as a result of violent reciprocation is minimized. Whenever desired, the drill string 2 may be forced downwardly relative to the mandrel so as to engage the teeth 16 and 17 (FIGS. 2–B) for supplementing the drive connection provided by the ball bearins 52 and grooves 53. As noted hereinbefore, the shock absorber maintains a constant weight on the drill bit by permitting controlled reciprocation between the housing and mandrel and preventing suspension of said bit off of the bottom of the borehole.

What is claimed is:

1. A shock absorber for a drill string having a drill bit at its lower end including:
   a tubular housing adapted to be mounted in the drill string adjacent the drill bit,
   a tubular mandrel slidably mounted in the housing and drivingly connected thereto for rotation therewith,
   the mandrel depending from said housing and having connection with the drill bit,
   a pair of spaced sealing means carried by said mandrel for packing off between said housing and mandrel and forming a closed chamber in said housing,
   the chamber containing a noncompressible fluid for cushioning relative reciprocation between said housing and mandrel,
   and a check valve assembly in said chamber for controlling the flow of the fluid upon relative reciprocation between said housing and mandrel,
   the check valve assembly having means for restricting the upward flow of fluid from below to above said assembly so as to resist downward reciprocation of said housing relative to said mandrel.

2. A shock absorber as defined in claim 1 wherein the check valve assembly includes:
   adjustable means for regulating the upflow and downflow of the fluid therethrough to control the speed of both upward and downward relative reciprocation.

3. A shock absorber as defined in claim 1 including:
   a plurality of ball bearings rotatably mounted in the interior of the housing so as to project inwardly into engagement with the mandrel,
   said mandrel having a plurality of external grooves extending longitudinally thereof for receiving the ball bearings to drivingly connect said mandrel to said housing and permit relative reciprocation therebetween.

4. A shock absorber as defined in claim 1 wherein the check valve includes:
   a body having a plurality of flow parts extending axially therethrough, and valve means for preventing upward flow through certain of the ports.

5. A shock absorber as defined in claim 4 including:
   adjustable means mounted in the body of the check valve assembly adjacent the unvalved ports for regulating the upflow and downflow of the fluid therethrough to control the speed of both upward and downward relative reciprocation.

6. A shock absorber as defined in claim 5 wherein the body of the check valve assembly has external radial openings communicating with its unvalved ports,
   the adjustable means for regulating flow through said ports including choke pins screwthreaded in the radial openings for intersecting said ports,
   the choke pins having inner ends substantially complementary to said ports whereby the latter may be substantially fully closed as well as fully opened.

References Cited

UNITED STATES PATENTS

| | | | |
|---|---|---|---|
| 1,804,700 | 5/1931 | Maxwell | 175—297 |
| 1,900,932 | 3/1933 | Hollestelle | 64—23 |
| 2,712,435 | 7/1955 | Allen | 175—321 X |
| 3,349,858 | 10/1967 | Chenoweth | 175—321 X |
| 3,345,832 | 10/1967 | Bottoms | 175—321 X |

ERNEST R. PURSER, Primary Examiner

U.S. Cl. X.R.

64—23; 175—321